US008398341B2

(12) United States Patent
Cohen

(10) Patent No.: US 8,398,341 B2
(45) Date of Patent: Mar. 19, 2013

(54) CUTTING HEAD FOR A REAMER

(75) Inventor: Tsur Cohen, Kfar Vradim (IL)

(73) Assignee: Iscar, Ltd., Tefen (IL)

( * ) Notice: Subject to any disclaimer, the term of this patent is extended or adjusted under 35 U.S.C. 154(b) by 1259 days.

(21) Appl. No.: 12/187,405

(22) Filed: Aug. 7, 2008

(65) Prior Publication Data

US 2009/0053001 A1 Feb. 26, 2009

(30) Foreign Application Priority Data

Aug. 23, 2007 (IL) .......................................... 185488

(51) Int. Cl.
*B23D 77/00* (2006.01)

(52) U.S. Cl. ........................... 408/227; 408/57; 407/116

(58) Field of Classification Search .................... 408/57, 408/223, 227, 229; *B23D 77/00*
See application file for complete search history.

(56) References Cited

U.S. PATENT DOCUMENTS 2,940,342 A * 6/1960 Lavallee ....................... 408/229
4,795,289 A * 1/1989 Potemkin ........................ 408/80
7,004,692 B2 2/2006 Hecht
7,775,751 B2 * 8/2010 Hecht et al. ..................... 408/57
8,025,662 B2 * 9/2011 Knisely et al. .................. 606/80
8,066,457 B2 * 11/2011 Buettiker et al. ............. 409/234
8,109,701 B2 * 2/2012 Shaheen ....................... 408/227
2007/0104549 A1 5/2007 Hecht et al.
2012/0121352 A1 * 5/2012 Ning et al. .................... 408/229

FOREIGN PATENT DOCUMENTS

WO 2007/085281 8/2007

OTHER PUBLICATIONS

International Search Report in PCT/IL2008/001080, dated Apr. 3, 2009.

* cited by examiner

*Primary Examiner* — Eric A Gates
(74) *Attorney, Agent, or Firm* — Womble Carlyle

(57) ABSTRACT

The present invention provides a cutting head of a reamer. At least two wiping pads extend rearwardly from a cutting head forward end. At least one cutting section comprises a cutting edge that extends from the cutting head forward end to the peripheral surface. The cutting edge is formed at the intersection of a rake surface and a relief surface. The rake surface is generally tangentially directed and faces a direction of rotation. A deflecting surface is formed adjacent the rake surface and generally transverse thereto. The deflecting surface extends from a rake surface first end in a direction away from the cutting edge. The deflecting surface makes an acute axial angle with respect to the axis of rotation. A rear end of the deflecting surface joins the peripheral surface adjacent the cutting section and distal the rear end of the cutting head.

24 Claims, 8 Drawing Sheets

CUTTING HEAD FOR A REAMER

FIELD OF THE INVENTION

The present invention relates to rotary cutting tools for performing reaming operations.

BACKGROUND OF THE INVENTION

Rotary cutting tools for performing reaming operations are known. Such cutting tools usually comprise a cutting head having an axis of rotation and cutting edges located at the front end of the cutting head. Each cutting edge is associated with a chip space for evacuating the chips formed during a cutting operation. The chip space opens into the front end of the cutting head and extends rearwardly therefrom, typically, to the rear end of the cutting head or proximal thereto. The chip space may be parallel to the axis of rotation, slanted with respect to the axis of rotation or helically curved.

Typically, the chip spaces are formed by a grinding process that is expensive and time consuming. Moreover, the relatively high cost of a reaming tool is derived from its high production cost, which arises mainly due to the production cost of the chip spaces.

SUMMARY OF THE INVENTION

In accordance with the present invention there is provided a cutting head of a reamer having an axis of rotation A defining a forward-to-rear direction and comprising:

a cutting head forward end, a cutting head rear end distal the cutting head forward end and a peripheral surface therebetween, the peripheral surface comprising at least two wiping pads extending rearwardly from the cutting head forward end, the peripheral surface between two adjacent wiping pads forms a peripheral section, and at least one cutting section located adjacent the cutting head forward end comprising:

a cutting edge extending from the cutting head forward end in a rearward and radially outward direction to the peripheral surface, the cutting edge being formed at an intersection of a rake surface and a relief surface, the rake surface being generally tangentially directed, facing a direction of rotation B and having a rake surface first end that is distal from the cutting edge, a deflecting surface adjacent the rake surface and generally transverse thereto, the deflecting surface extending from the rake surface first end in a direction away from the cutting edge, wherein the deflecting surface makes an acute axial angle $\alpha$ with respect to the axis of rotation A such that an imaginary extension of the deflecting surface intersects the axis of rotation at a point forward of the cutting head, and a rear end of the deflecting surface joins the peripheral surface adjacent the cutting section and distal the rear end of the cutting head.

According to a specific embodiment of the present invention, the deflecting surface joins a wiping pad.

If desired, the deflecting surface is planar.

Further, if desired, the deflecting surface is concave.

Advantageously, the deflecting surface makes a non-zero tangential angle $\beta$ with respect to a line E perpendicular to a radially extending line F passing through the rear end of the deflecting surface as seen in a forward end view of the cutting head.

Typically, the tangential angle $\beta$ is acute and negative.

According to a specific embodiment of the present invention, the rake surface is slanted at a negative acute axial angle with respect to the axis of rotation as seen in a side view of the cutting head.

According to another specific embodiment of the present invention, the deflecting surface comprises a first deflecting portion that is connected to the cutting head forward end and extends rearwardly therefrom, and a second deflecting portion that is connected to the first deflecting portion and extends rearwardly therefrom.

Typically, the cutting head is detachably connected to a tool holder.

Further typically, the cutting head is provided with a through bore having a bore peripheral wall extending from the cutting head forward end to the cutting head rear end, the through bore comprising an engaging arrangement located on the bore peripheral wall, adjacent the cutting head rear end.

Still further typically, the at least one cutting section comprises a generally radially directed channel located at the cutting head forward end, the channel having channel side walls and a channel bottom wall therebetween, the channel side walls extending generally in a radial direction with respect to the axis of rotation A.

If desired, the wiping pads extend from the cutting head forward end to the cutting head rear end.

Typically, the peripheral section is planar.

If desired, the peripheral section is concave.

Further if desired, the peripheral section is convex.

In one embodiment, the peripheral section is divided into a first peripheral section, a second peripheral section and a peripheral intermediate section therebetween. The peripheral intermediate section is spaced from the axis of rotation A by an intermediate distance r which is smaller than a cutting radius R by which the wiping pads are spaced from the axis of rotation A.

According to another embodiment, of the present invention, the intermediate distance r is equal to the cutting radius R.

Typically, the relief surface comprises a first relief surface adjacent the cutting edge and a second relief surface tangentially extending beyond the first relief surface, the first relief surface forming a first relief tangential angle, the second relief surface forming a second relief tangential angle, and the second relief tangential angle is greater than the first relief tangential angle as seen in a forward end view of the cutting head.

Further typically, the wiping pad comprises a wiping leading edge, a wiping trailing edge peripherally behind the wiping leading edge, and a wiping surface therebetween that lies on a cylindrical surface having a diameter no greater than a cutting head external diameter.

If desired, the wiping leading edge is parallel to the wiping trailing edge.

According to a specific embodiment of the present invention, the cutting head further comprises a rear circular disc located proximate the cutting head rear end and rearwardly therefrom. The rear circular disc has an axis of rotation that coincides with the axis of rotation A of the cutting head and a disc diameter d that is slightly smaller than the cutting head external diameter D.

Typically, the cutting head has unitary one-piece construction and comprises sintered carbide powders.

Further in accordance with the present invention there is provided a cutting head of a reamer having an axis of rotation A and comprising:

a cutting head forward end, a cutting head rear end distal the cutting head forward end and a peripheral surface therebetween, the peripheral surface comprising at least two wiping pads extending rearwardly from the cutting head forward end, and at least one cutting section located between the cutting head forward end and the peripheral surface, the at least one cutting section comprising:

a cutting edge extending from the cutting head forward end to the peripheral surface, defining a cutting head external diameter D and formed at an intersection of a rake surface and a relief surface, the rake surface being generally tangentially directed, facing a direction of rotation B and having a rake surface first end that is distal from the cutting edge, wherein the cutting head comprises a rear circular disc located rearwardly to the cutting head rear end and having an axis of rotation that coincides with the axis of rotation A of the cutting head, the rear circular disc having a disc diameter d that is slightly smaller than the cutting head external diameter D.

Typically, the cutting head comprises a deflecting surface adjacent the rake surface and generally transverse thereto, the deflecting surface extending from the rake surface first end in a direction away from the cutting edge, and wherein:

the deflecting surface makes a negative acute axial angle α with respect to the axis of rotation A such that an imaginary extension of the deflecting surface intersects the axis of rotation at a point forward of the cutting head, and a rear end of the deflecting surface joins the peripheral surface adjacent the cutting section and distal the rear end of the cutting head.

BRIEF DESCRIPTION OF FIGURES

For a better understanding of the present invention and to show how the same may be carried out in practice, reference will now be made to the accompanying drawings, in which.

DETAILED DESCRIPTION OF THE INVENTION

Figure 1:
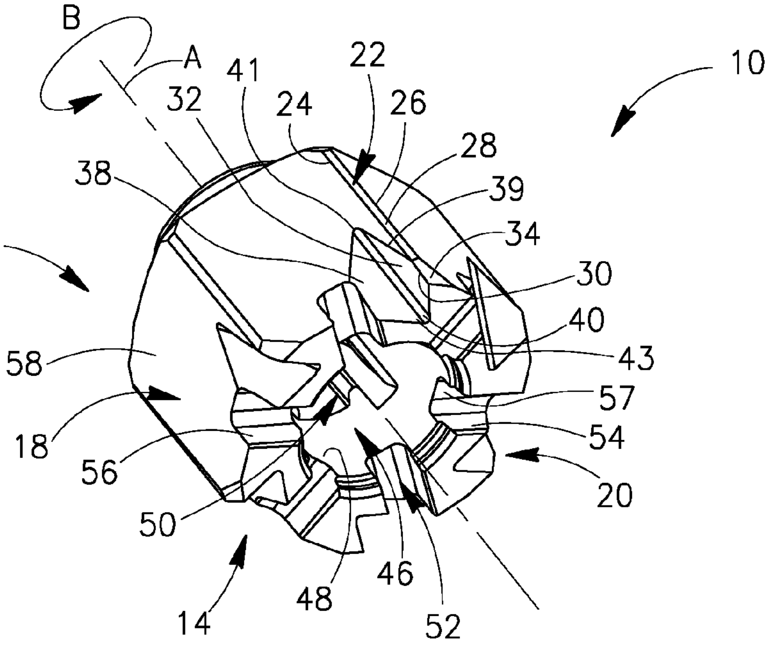
FIG. 1 is a perspective view of a first embodiment of a reamer cutting head in accordance with the present invention.
Figure 2:
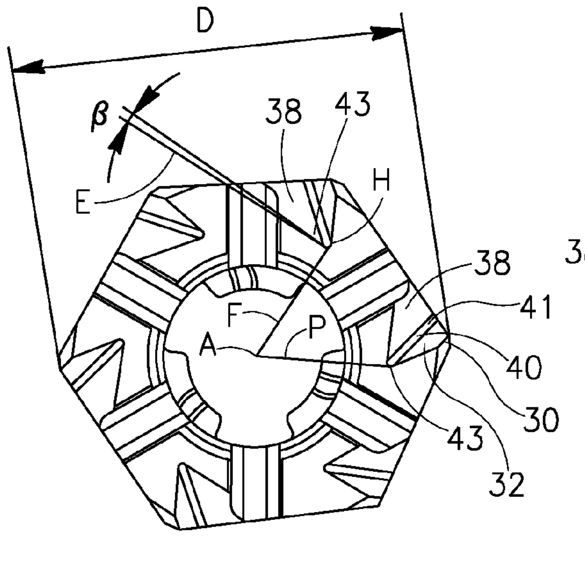
FIG. 2 is a forward end view of the cutting head of FIG. 1.
Figure 3:
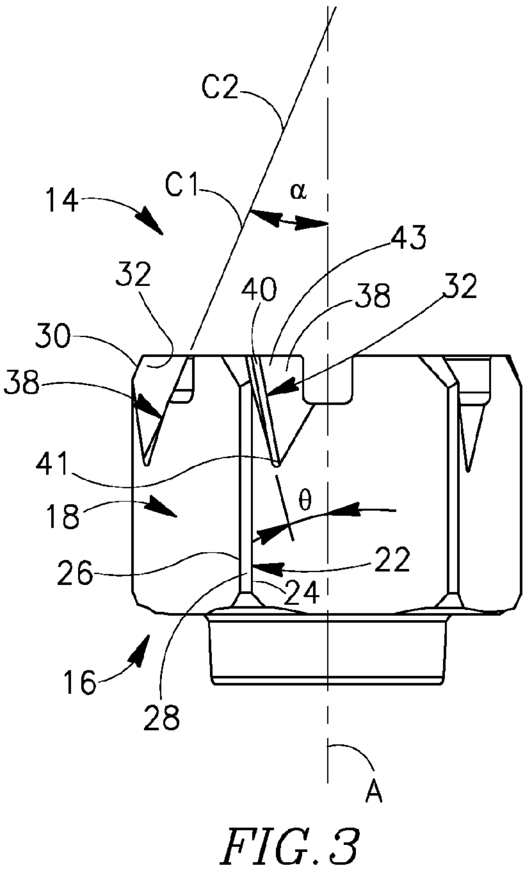
FIG. 3 is a side view of the cutting head of FIG. 1.

Attention is first drawn to FIGS. 1 to 3 showing a cutting head 10 of a reamer 12 (shown in FIG. 16) in accordance with the present invention. The reamer cutting head 10 may be formed as an integral part of a tool holder, fixedly brazed to a tool holder, or, may be detachably connected thereto. When the cutting head 10 is fixedly brazed to a tool holder or detachably connected thereto, it typically has unitary one-piece construction and comprises sintered carbide powders. In one embodiment in which the cutting head 10 is detachably connected to a tool holder, it may be attached in the manner disclosed in U.S. Pat. No. 7,004,692 to Hecht. Other ways of detachably connecting the cutting head 10 to the tool holder are also possible and are known to those skilled in the art.

The cutting head 10 has a cutting head external diameter D and rotational symmetry around an axis of rotation A which defines and forward-to-rear direction. The cutting head 10 comprises a cutting head forward end 14, a cutting head rear end 16 distal the cutting head forward end 14 and a peripheral surface 18 extending therebetween. A direction of rotation B of the cutting head 10 is defined in a direction around the axis of rotation A, and, in the described embodiments, it is counterclockwise when the cutting head 10 is viewed from its forward end 14. Equally peripherally distributed recessed cutting sections 20 are located adjacent the cutting head forward end 14 and open out to the cutting head forward end 14 and to the peripheral surface 18.

A wiping pad 22 extends rearwardly from each of the cutting sections 20 to the cutting head rear end 16. In the embodiments shown in FIGS. 1 to 3, the wiping pad 22 extends rearwardly parallel to the axis of rotation A. However, the wiping pad 22 may extend rearwardly in directions that are not parallel to the axis of rotation A, as shown, for example, in FIG. 4. The purpose of the wiping pads 22 is to smoothen the surface of the reamed bore thus increasing surface quality, provide good leading of the cutting head in a non-continuous bore, keeping the cylindricity of the bores and stabilizing the cutting head whilst reaming a pre-drilled hole. The wiping pad 22 has a wiping leading edge 24, which leads the wiping pad 22 in the direction of rotation B, a wiping trailing edge 26, peripherally rearward to the wiping leading edge 24, and a wiping surface 28 therebetween.

In one embodiment, the wiping surface 28 lies on a cylindrical surface having a diameter no greater than the cutting head external diameter D. In some embodiments, the wiping surface 28 may taper rearwardly with respect to the axis of rotation A at an angle of 0° to 0.1°.

Figure 5:
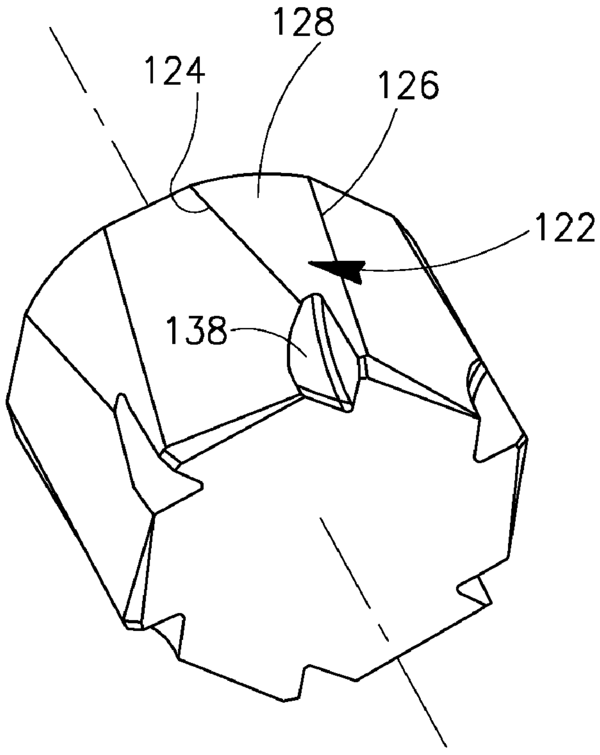
FIG. 5 is a perspective view of a third embodiment of a cutting head in accordance with the present invention.

In some embodiments, the wiping leading edge 24 is parallel to the wiping trailing edge 26 thus defining a strip-like wiping surface 28. The strip like wiping surface 28 may be narrow as shown in FIG. 1. However, the wiping leading and trailing edges 124, 126 of a wiping pad 122 do not have to be parallel to each other and they may form any wiping surface 128 therebetween having a variable width as shown, for example, in FIG. 5. As seen in the embodiment of FIG. 5, the deflecting surface 138 joins the wiping pad 122.

Each of the cutting sections 20 has a cutting edge 30 extending from the cutting head forward end 14, in a rearward and radially outward direction, to the peripheral surface 18. The cutting edge 30 is formed at an intersection of a rake surface 32 and a relief surface 34. The rake surface 32 is generally tangentially directed, facing the direction of rotation B. The rake surface 32 extends from the cutting edge 30 towards a rake surface first end 40 that is distal from the cutting edge 30. A deflecting surface 38 joins the rake surface 32 at the rake surface first end 40. In a forward end view of the cutting head 10, the radially outermost portions of diametrically opposing cutting edges 30 define the diameter of the cutting head, as shown in FIG. 2.

In one embodiment, the deflecting surface 38 may be planar, oriented transversely to the rake surface 32 and extend from the rake surface first end 40 in a direction generally away from the cutting edge 30 and towards the peripheral surface 18. The deflecting surface 38 makes a negative axial angle α with respect to the axis of rotation A as shown in a side view of the cutting head 10 and measured in an imaginary plane P containing the axis of rotation A and also a rear end 41 of the deflecting surface 38 and of the rake surface first end 40. Thus, an imaginary extension of the deflecting surface 38 (imaginary extension represented by the line C1 in FIG. 3) intersects the axis of rotation A at a point forward of the cutting head.

In some embodiments, the deflecting surface 38 may be concave. When the deflecting surface 38 is concave, the angle α is measured between the axis of rotation A and a line C2 that represents the average inclination of the deflecting surface 38 as seen in a side view of the cutting head 10 and measured in the imaginary plane P. Even when the deflecting surface 38 is concave, however, an imaginary extension thereof intersects the axis of rotation A at a point forward of the cutting head. The rear end 41 of the deflecting surface 38 joins the peripheral surface 18 adjacent the cutting section 20 and distal the rear end 16 of the cutting head 10. Thus, the deflecting surface 38 is located closer to the cutting head forward end 14 than to the cutting head rear end 16.

The deflecting surface 38 may make a non-zero tangential angle β with respect to a line E perpendicular to a radially extending line F passing through the forward end 43 of the deflecting surface 38, which is shown as a point H in FIG. 2. The tangential angle β has been defined for the case in which the deflecting surface 38 is planar. However, the angle β is intended to show the general inclination of the deflecting surface 38 in a forward end view of the cutting head 10, therefore, when the deflecting surface 38 is concave, the angle β is measured, in a forward end view of the cutting head 10, between the line E, as described above, and a line that represents the average inclination of the deflecting surface 38 as seen in a forward end view of the cutting head 10.

Figure 4:
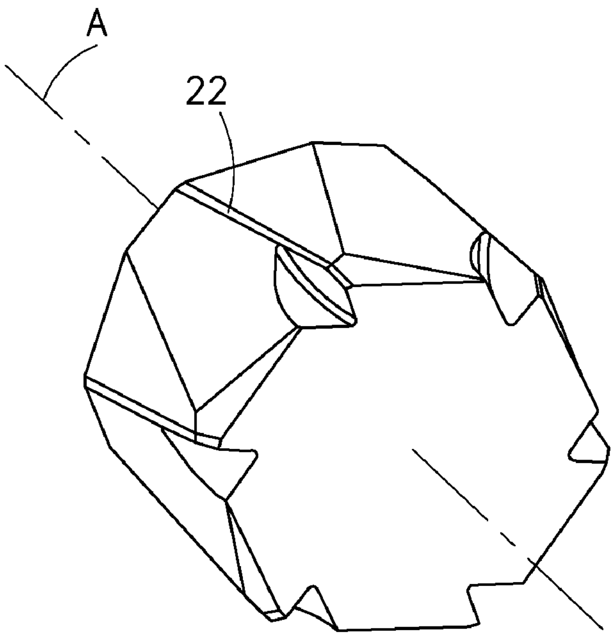
FIG. 4 is a perspective view of a second embodiment of a cutting head in accordance with the present invention.

The rake surface 32 joins the peripheral surface 18 at a peripheral rake edge 39. The peripheral rake edge 39 may merge with the wiping leading edge 24 of the wiping pad 22, as shown in FIG. 4. Preferably, as shown in FIGS. 1 and 3, the rake surface 32 is slanted at a negative acute axial angle θ with respect to the axis of rotation A.

The construction of the deflecting surface 38 and the rake surface 32 as described above enables chips formed during a cutting operation to be deflected forwardly, towards the cutting head forward end 14. This may obviate the necessity to grind rearwardly extending chip flutes. Advantageously, the cutting tool according to the present invention is useful when reaming through bores since there is no need to evacuate the chips rearwardly from the cutting head forward end 14.

The deflecting surface 38 according to the present invention does not have to be formed from a single surface. For example, as shown in FIG. 6, the deflecting surface 38 may comprise a first deflecting portion 42 that is connected to the cutting head forward end 14 and extending rearwardly therefrom and a second deflecting portion 44 that is connected to the first deflecting portion 42 and extending rearwardly therefrom.

Figure 6:
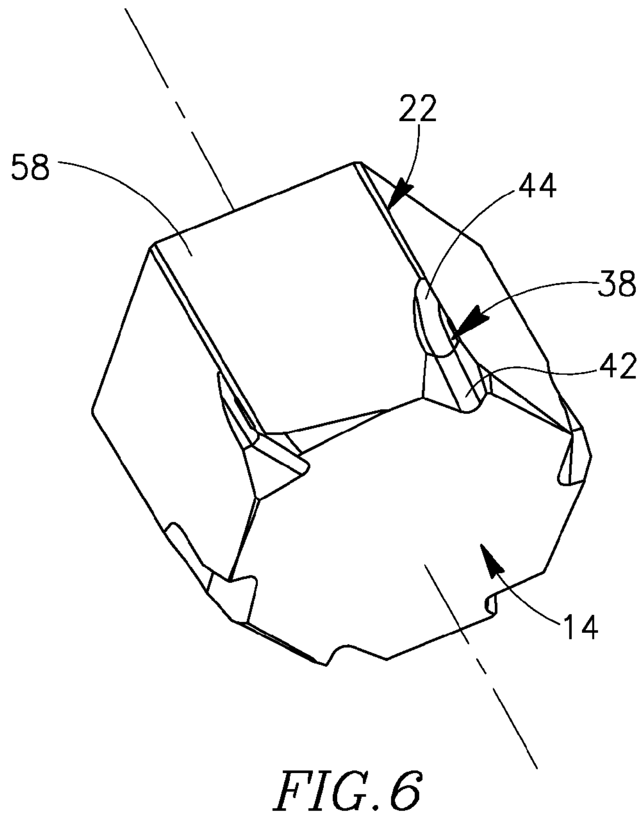
FIG. 6 is a perspective view of a fourth embodiment of a cutting head in accordance with the present invention.

As seen in FIG. 6, the deflecting surface 38, at the second deflecting portion 44, joins the wiping pad 22.

Figure 7:
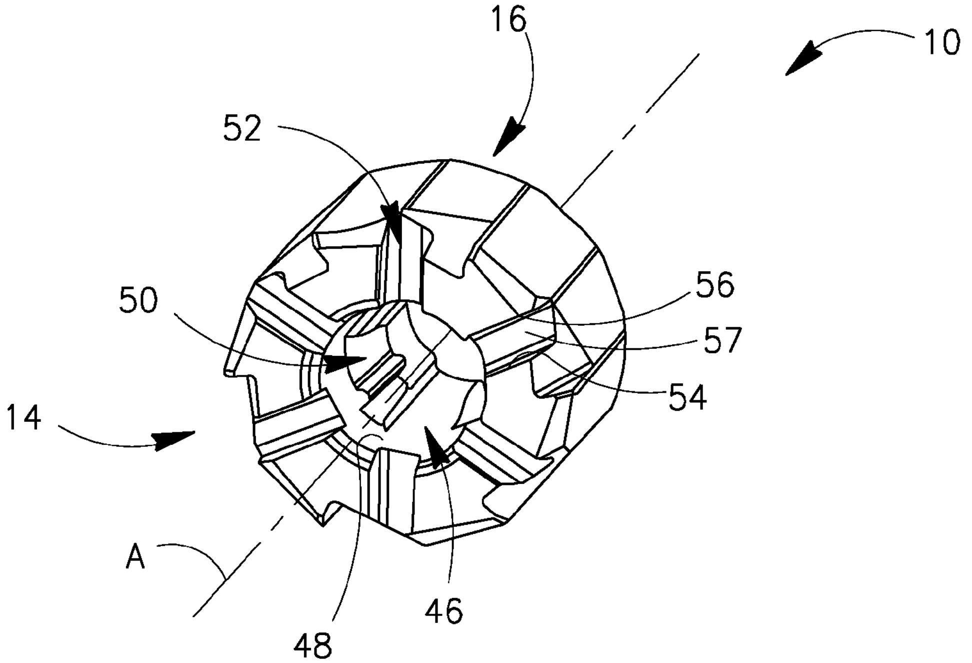
FIG. 7 is a perspective view of a fifth embodiment of a cutting head in accordance with the present invention.

When the cutting head 10 is detachably connected to a tool holder, it is typically provided, as shown in FIGS. 1 and 7 with a through bore 46 having a bore peripheral wall 48 that extends from the cutting head forward end 14 to the cutting head rear end 16. The through bore 46 comprises an engaging arrangement 50 located on the bore peripheral wall 48, adjacent the cutting head rear end 16.

Typically, each of the cutting sections 20 of the cutting head 10 has associated with it a generally radially directed channel 52 having channel side walls 54, 56 and a channel bottom wall 57 therebetween. The channel side walls 54, 56 extend generally in a radial direction with respect to the axis of rotation A. The channel 52 may be used as a driving slot for a tightening key (not shown) in order to tighten the cutting head onto a tool holder, and may be used to transfer cooling agent from the through bore 46 to the cutting zone.

Figure 8:
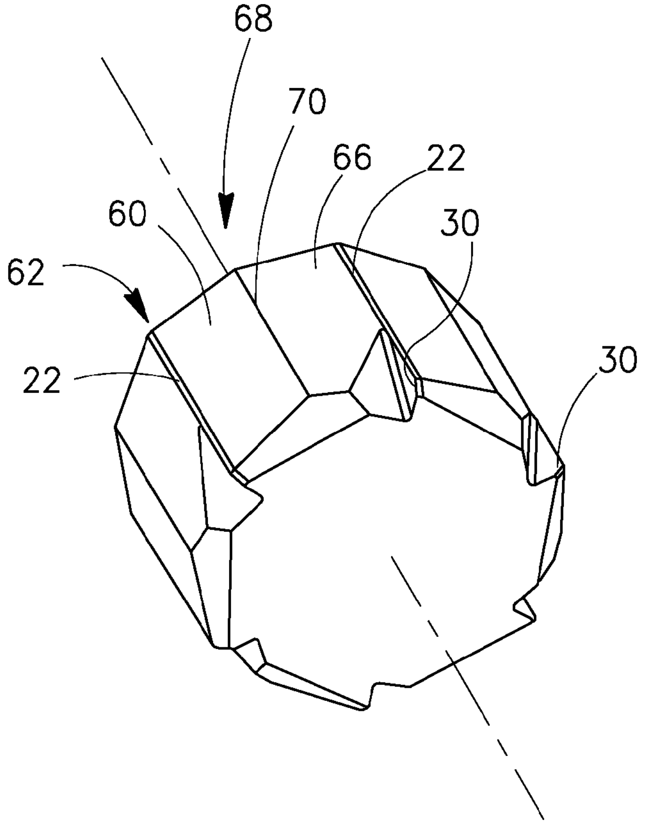
FIG. 8 is a perspective view of a sixth embodiment of a cutting head in accordance with the present invention.
Figure 9:
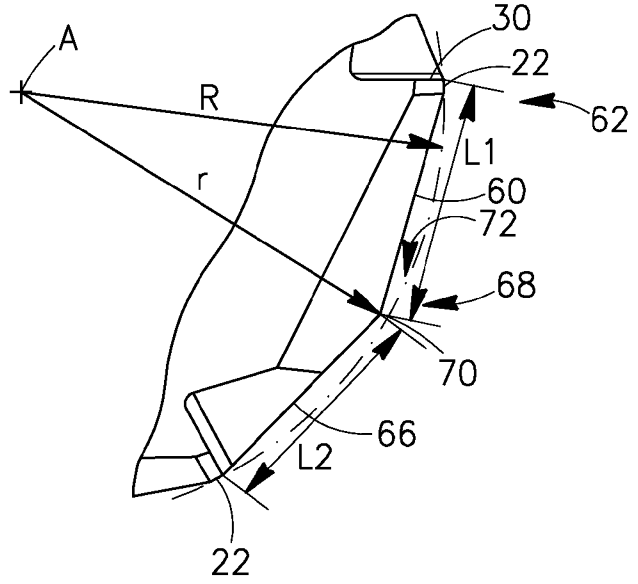
FIG. 9 is en enlargement of a portion of a forward end view of the cutting head of FIG. 8.

Typically, the peripheral surface 18 between two adjacent wiping pads 22 is planar and constitutes a peripheral section 58. However, if desired, as shown in FIGS. 8 to 9, the peripheral section 58 may be divided into a first peripheral section 60, at a trailing side direction 62 of the adjacent cutting edge 30, a second peripheral section 66, at a trailing side 68 of the first peripheral section 60, and, a peripheral intermediate section 70 between the first peripheral section 60 and the second peripheral section 66. The peripheral intermediate section 70 is spaced from the axis of rotation A an intermediate distance r that is smaller than the cutting radius R which is the distance by which the wiping pads 22 are spaced from the axis of rotation A. Alternatively, the peripheral intermediate section 70 may be spaced from the axis of rotation A an intermediate distance r that is equal to the cutting radius R, thus, the peripheral intermediate section may also be used as a wiping pad.

This arrangement potentially provides several advantages. First, it enables to decrease the amount by which the peripheral surface 18 has to be ground, thus reducing the production cost of the cutting head 10. Second, since the first and second peripheral sections 60, 66 do not radially extend to the cutting radius R, they may be produced to a lesser degree of surface finish thus reducing their production cost. Third, the existence of two peripheral sections between two consecutive cutting edges instead of only one peripheral section, decreases the space 72 between the cutting head 10 and the reamed bore thus reducing the possibility of chips getting stuck in the gap. Fourth, the reduced gap limits the amount of cooling agent that escapes between the cutting head and the reamed bore thus increasing the cooling efficiency and reducing the production cost of the cutting head 10. The length L1 of the first peripheral section 60 does not have to be similar in size to the length L2 of the second peripheral section 66 and so a chord-length ratio CR=L1/L2 may take on values other than one.

Figure 10:
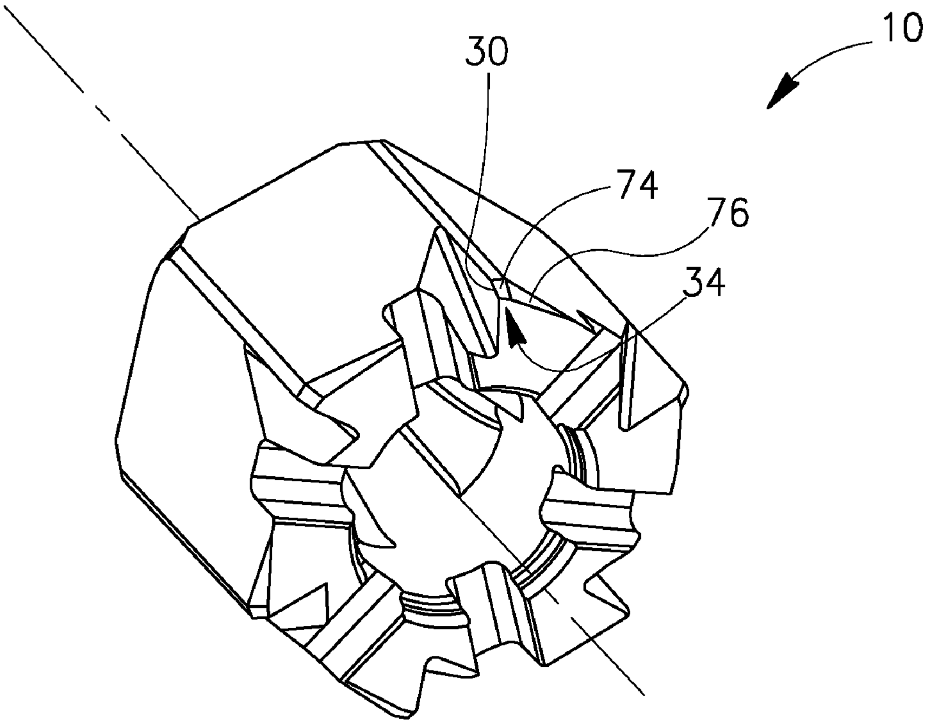
FIG. 10 is a perspective view of a seventh embodiment of a cutting head in accordance with the present invention.
Figure 11:
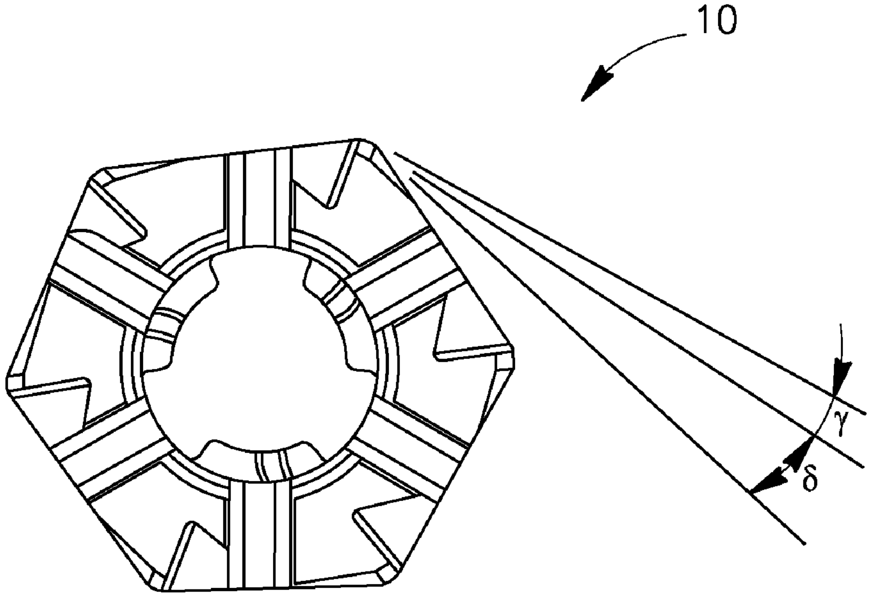
FIG. 11 is a forward end view of the cutting head of FIG. 10.

If desired, as shown in FIGS. 10 and 11, the relief surface 34 associated with a specific cutting edge 30 comprises a first relief surface 74 adjacent the cutting edge 30 and a second relief surface 76 tangentially extending beyond the first relief surface 74. The first relief surface 74 forms a first relief tangential angle γ, the second relief surface 76 forms a second relief tangential angle δ, and, the second relief tangential angle δ is greater than the first relief tangential angle γ as seen in a forward end view of the cutting head 10.

Figure 12:
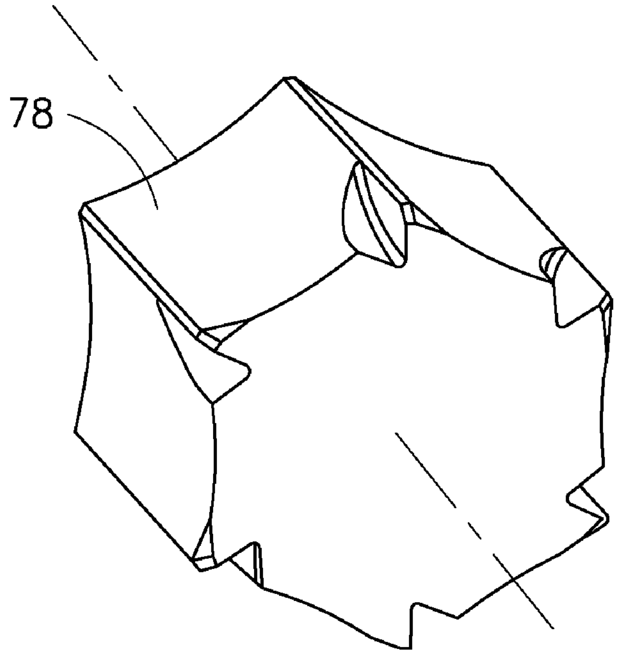
FIG. 12 is a perspective view of an eighth embodiment of a cutting head in accordance with the present invention.
Figure 13:
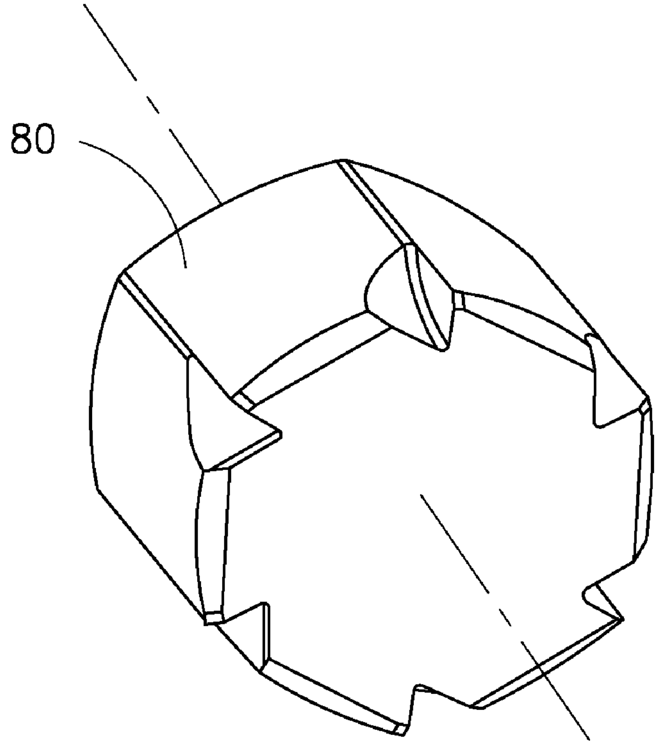
FIG. 13 is a perspective view of a ninth embodiment of a cutting head in accordance with the present invention.

The peripheral sections 58 do not have to be planar as seen in FIGS. 1 to 11 and they may be concave or convex. For example, FIG. 12 shows a cutting head having concave peripheral sections 78 and FIG. 13 shows a cutting head having convex peripheral sections 80.

Figure 14:
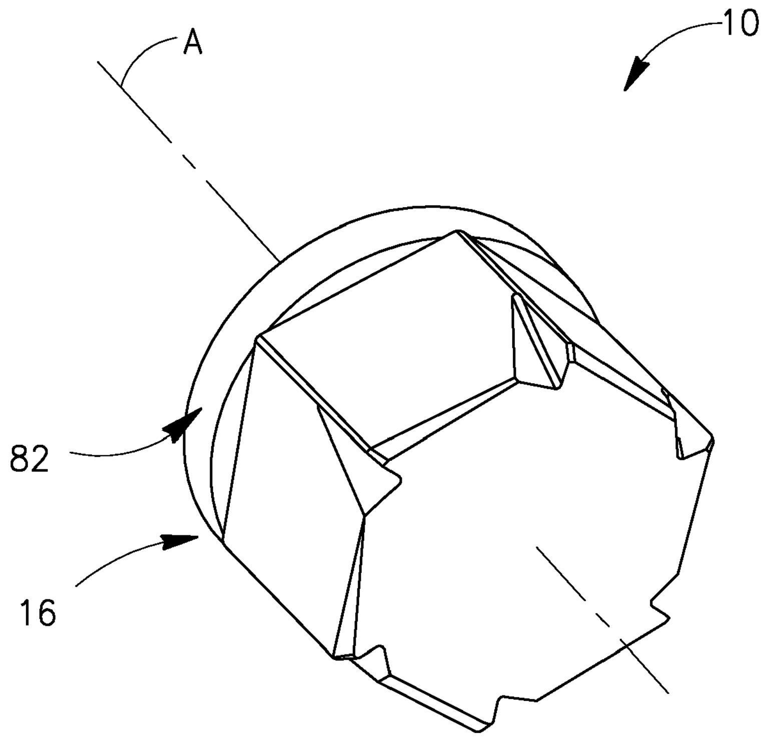
FIG. 14 is a perspective view of a tenth embodiment of a cutting head in accordance with the present invention.
Figure 15:
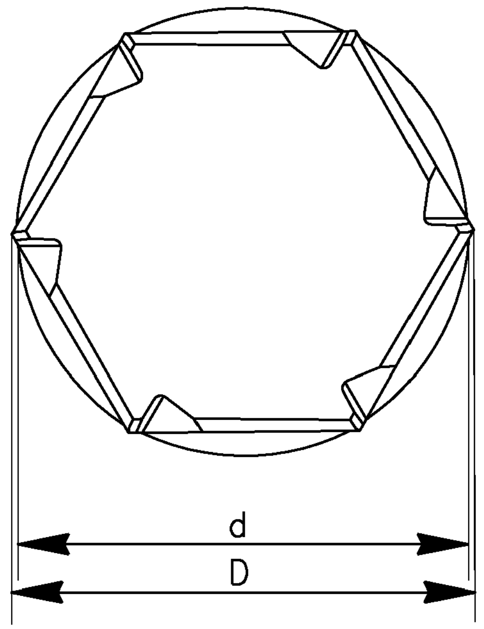
FIG. 15 is a forward end view of the cutting head of FIG. 14.

FIGS. 14 and 15 show a cutting head 10 formed with a rear circular disc 82 located proximate the cutting head rear end 16 and rearwardly therefrom. The rear circular disc 82 has an axis of rotation that coincides with the axis of rotation A of the cutting head 10. The rear circular disc 82 has a disc diameter d that is slightly smaller than the cutting head external diameter D. The purpose of such a structure is to limit to a minimum the passage of cooling agent rearward to the cutting head rear end 16, therefore, reducing losses and reducing the production cost of the cutting head 10.

Figure 16:
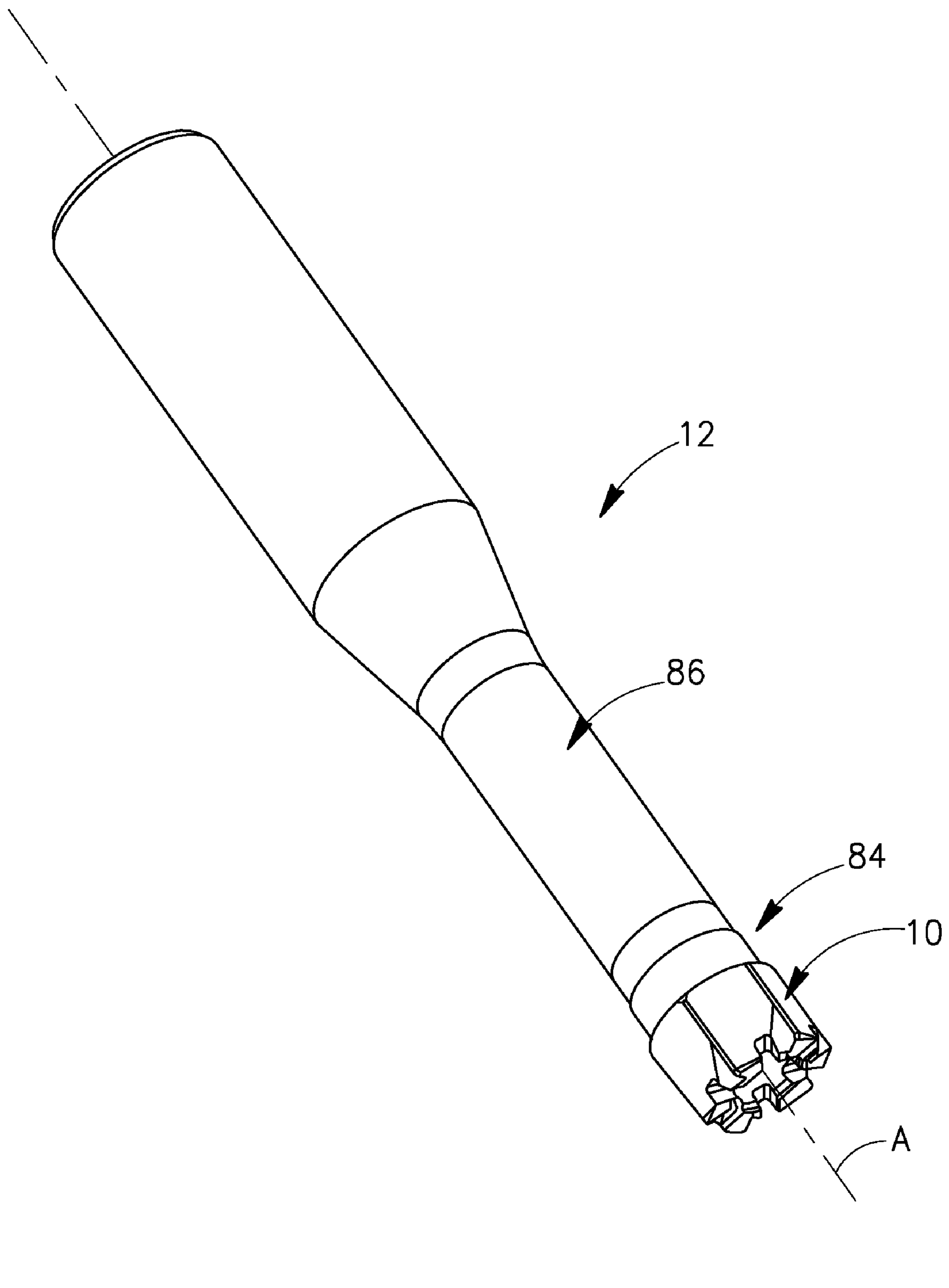
FIG. 16 is a perspective view of a reamer with a cutting head in accordance with the present invention.

FIG. 16 shows a cutting head 10 of a reamer 12. The cutting head 10 is detachably connected to a front end 84 of a tool holder 86 having an axis of rotation that coincides with the axis of rotation A of the cutting head 10.

Although the present invention has been described to a certain degree of particularity, it should be understood that various alterations and modifications could be made without departing from the spirit or scope of the invention as hereinafter claimed.

What is claimed is:

1. A cutting head (10) of a reamer having an axis of rotation (A) defining a forward-to-rear direction and comprising:

a cutting head forward end (14), a cutting head rear end (16) distal the cutting head forward end (14) and a peripheral surface (18) therebetween, the peripheral surface (18) comprising at least two wiping pads (22) extending rearwardly from the cutting head forward end (14), the peripheral surface (18) between two adjacent wiping pads forming a peripheral section (58), and at least one cutting section (20) located adjacent the cutting head forward end (14) comprising:

a cutting edge (30) extending from the cutting head forward end (14) in a rearward and radially outward direction to the peripheral surface (18), the cutting edge being formed at an intersection of a rake surface (32) and a relief surface (34), the rake surface (32) being generally tangentially directed, facing a direction of rotation (B) and having a rake surface first end (40) that is distal from the cutting edge (30), a deflecting surface (38) adjacent the rake surface (32) and generally transverse thereto, the deflecting surface (38) extending from the rake surface first end (40) in a direction away from the cutting edge (30), wherein:

the deflecting surface (38) makes an acute axial angle (α) with respect to the axis of rotation (A) such that an imaginary extension of the deflecting surface (38) intersects the axis of rotation (A) at a point forward of the cutting head, and a rear end (41) of the deflecting surface (38) joins the peripheral surface (18) adjacent the cutting section (20) and distal the rear end (16) of the cutting head (10).

2. The cutting head according to claim 1, wherein the deflecting surface (38, 138) joins a wiping pad (22, 122).

3. The cutting head according to claim 1, wherein the deflecting surface (38) is planar.

4. The cutting head according to claim 1, wherein the deflecting surface (38) is concave.

5. The cutting head according to claim 1, wherein the deflecting surface (38) makes a non-zero tangential angle (β) with respect to a line (E) perpendicular to a radially extending line (F) passing through a forward end (43) of the deflecting surface (38) as seen in a forward end view of the cutting head (10).

6. The cutting head according to claim 5, wherein the tangential angle (β) is acute and negative.

7. The cutting head according to claim 1, wherein the rake surface (32) is slanted at a negative acute axial angle (θ) with respect to the axis of rotation (A) as seen in a side view of the cutting head (10).

8. The cutting head according to claim 1, wherein the deflecting surface (38) comprises a first deflecting portion (42) that is connected to the cutting head forward end (14) and extending rearwardly therefrom and a second deflecting portion (44) that is connected to the first deflecting portion (42) and extending rearwardly therefrom.

9. The cutting head according to claim 1, wherein the cutting head (10) is detachably connected to a tool holder (86).

10. The cutting head according to claim 9, wherein the cutting head (10) is provided with a through bore (46) having a bore peripheral wall (48) extending from the cutting head forward end (14) to the cutting head rear end (16), the through bore (46) comprising an engaging arrangement (50) located on the bore peripheral wall (48), adjacent the cutting head rear end (16).

11. The cutting head according to claim 1, wherein the at least one cutting section (20) comprises a generally radially directed channel (52) located at the cutting head forward end (14), the channel (52) having channel side walls (54, 56) and a channel bottom wall (57) therebetween, the channel side walls (54, 56) extending generally in a radial direction with respect to the axis of rotation (A).

12. The cutting head according to claim 1, wherein the wiping pads (22) extend from the cutting head forward end (14) to the cutting head rear end (16).

13. The cutting head according to claim 1, wherein the peripheral section (58) is planar.

14. The cutting head according to claim 1, wherein the peripheral section (58) is concave.

15. The cutting head according to claim 1, wherein the peripheral section (58) is convex.

16. The cutting head according to claim 1, wherein:

the peripheral section (58) is divided into a first peripheral section (60), a second peripheral section (66) and a peripheral intermediate section (70) therebetween that is spaced from the axis of rotation (A) by an intermediate distance (r) which is smaller than a cutting radius (R) by which the wiping pads are spaced from the axis of rotation (A).

17. The cutting head according to claim 1, wherein:

the peripheral section (58) is divided into a first peripheral section (60), a second peripheral section (66) and a peripheral intermediate section (70) therebetween that is spaced from the axis of rotation (A) by an intermediate distance (r) which is equal to a cutting radius (R) by which the wiping pads are spaced from the axis of rotation (A).

18. The cutting head according to claim 1, wherein the relief surface (34) comprises a first relief surface (74) adjacent the cutting edge (30) and a second relief surface (76) tangentially extending beyond the first relief surface (74), the first relief surface (74) forming a first relief tangential angle (γ), the second relief surface (76) forming a second relief tangential angle (δ), and the second relief tangential angle (δ) is greater than the first relief tangential angle (γ) as seen in a forward end view of the cutting head (10).

19. The cutting head according to claim 1, wherein the wiping pad (22) comprises a wiping leading edge (24), a wiping trailing edge (26) peripherally behind the wiping leading edge (24), and a wiping surface (28) therebetween that lies on a cylindrical surface having a diameter no greater than a cutting head external diameter (D).

20. The cutting head according to claim 19, wherein the wiping leading edge (24) is parallel to the wiping trailing edge (26).

21. The cutting head according to claim 1, further comprising:

a rear circular disc (82) proximate the cutting head rear end (16) and rearwardly therefrom, the rear circular disc (82) having an axis of rotation that coincides with the axis of rotation (A) of the cutting head (10), the rear circular disc (82) having a disc diameter (d) that is slightly smaller than a cutting head external diameter (D).

22. The cutting head according to claim 1, wherein the cutting head (10) has unitary one-piece construction and comprises sintered carbide powders.

23. The cutting head according to claim 1, wherein:

the cutting edge (30) defines a cutting head external diameter (D);

the cutting head (10) comprises a rear circular disc (82) located rearwardly to the cutting head rear end (16) and having an axis of rotation that coincides with the axis of rotation (A) of the cutting head (10), and the rear circular disc (82) has a disc diameter (d) that is slightly smaller than the cutting head external diameter (D).

24. The cutting head according to claim 23, wherein the cutting head comprises a deflecting surface (38) adjacent the rake surface (32) and generally transverse thereto, the deflecting surface (38) extending from the rake surface first end (40) in a direction away from the cutting edge (30), and wherein:

the deflecting surface (38) makes a negative acute axial angle ($\alpha$) with respect to the axis of rotation (A) such that an imaginary extension of the deflecting surface (38) intersects the axis of rotation (A) at a point forward of the cutting head, and a rear end (41) of the deflecting surface (38) joins the peripheral surface (18) adjacent the cutting section (20) and distal the rear end (16) of the cutting head (10).

* * * * *